United States Patent
Brinkman

(10) Patent No.: US 7,952,336 B2
(45) Date of Patent: May 31, 2011

(54) DC/DC CONVERTER WITH DYNAMIC OFFSET COMPENSATION

(75) Inventor: Remco Brinkman, Deventer (NL)

(73) Assignee: ST-Ericsson SA, Geneva (CH)

( * ) Notice: Subject to any disclaimer, the term of this patent is extended or adjusted under 35 U.S.C. 154(b) by 562 days.

(21) Appl. No.: 11/575,305

(22) PCT Filed: Sep. 9, 2005

(86) PCT No.: PCT/IB2005/052958
§ 371 (c)(1),
(2), (4) Date: Aug. 12, 2008

(87) PCT Pub. No.: WO2006/030361
PCT Pub. Date: Mar. 23, 2006

(65) Prior Publication Data
US 2009/0128109 A1    May 21, 2009

(30) Foreign Application Priority Data
Sep. 14, 2004   (EP) ..................... 04104434

(51) Int. Cl.
*G05F 1/00*    (2006.01)
(52) U.S. Cl. ........................................ 323/282
(58) Field of Classification Search .......... 323/272, 323/282–284
See application file for complete search history.

(56) References Cited

U.S. PATENT DOCUMENTS

| | | | | |
|---|---|---|---|---|
| 4,928,054 A * | 5/1990 | Martin-Lopez | ............... | 323/288 |
| 5,747,976 A * | 5/1998 | Wong et al. | ............... | 323/282 |
| 6,396,250 B1 * | 5/2002 | Bridge | ............... | 323/283 |
| 6,590,369 B2 * | 7/2003 | Burstein et al. | ............... | 323/272 |
| 6,621,256 B2 * | 9/2003 | Muratov et al. | ............... | 323/282 |
| 6,784,698 B1 * | 8/2004 | Brenden | ............... | 327/51 |
| 6,936,997 B2 * | 8/2005 | Mullett | ............... | 323/222 |
| 6,961,253 B1 * | 11/2005 | Cohen | ............... | 363/89 |
| 6,969,977 B1 * | 11/2005 | Smith | ............... | 323/222 |
| 2002/0145891 A1 | 10/2002 | Ling | | |
| 2005/0151523 A1 * | 7/2005 | Paulos | ............... | 323/282 |

FOREIGN PATENT DOCUMENTS

WO   WO9854827 A    12/1998
WO   WO2004027993 A   4/2004

OTHER PUBLICATIONS

International Search Report dated Dec. 22, 2005 in connection with PCT Application No. PCT/IB2005/052958.
Written Opinion of the International Searching Authority dated Mar. 14, 2007 in connection with PCT Application No. PCT/IB2005/052958.
Mickey McClure, "Constant Input Power Modulation Technique for High Efficiency Boost Converter Optimized for Lithium-Ion Battery Applications", Applied Power Electronics Conference and Exposition, IEEE, Mar. 3-7, 1996, p. 850-855.

* cited by examiner

*Primary Examiner* — Adolf Berhane
*Assistant Examiner* — Yemane Mehari

(57) ABSTRACT

The present invention provides a DC/DC up-converter (100) that is implemented in form of a switching regulator (100). The DC/DC converter (100) makes use of a switching transistor (104) that controls a charging current for a capacitive element (112). Moreover, the DC/DC converter (100) provides control means (106, 140) to realize an accurate switch-off of the switching transistor (104) at a point of time when the charging current equals zero. Deviations of a first control means (106) are detected by means of a second control means (140) and a corresponding offset control signal (142) is generated for reducing the first control means' offset in a successive duty cycle.

20 Claims, 3 Drawing Sheets

DC/DC CONVERTER WITH DYNAMIC OFFSET COMPENSATION

CROSS-REFERENCE TO RELATED APPLICATION(S)

The present application claims priority under 35 U.S.C. §365 to International Patent Application No. PCT/IB2005/052958 filed Sep. 9, 2005, entitled "DC/DC CONVERTER WITH DYNAMIC OFFSET COMPENSATION". International Patent Application No. PCT/IB2005/052958 claims priority under 35 U.S.C. §365 and/or 35 U.S.C. §119(a) to European Patent Application No. 04104434.8 filed Sep. 14, 2004 and which are incorporated herein by reference into the present disclosure as if fully set forth herein.

The present invention relates to the field of DC/DC conversion.

DC/DC converters serve to provide a conversion of a DC input voltage to a different DC output voltage. DC/DC converters are widely used in battery driven electronic devices that require an input voltage differing from a voltage provided by e.g. a battery. DC/DC converters can be realized in a plurality of different ways. They are preferably implemented as linear regulators or switching regulators. While linear regulators only provide step-down conversion, switching regulators can be arbitrarily configured in order to provide step-up, step-down or an inversion of an output voltage with respect to an input voltage. Generally, switching regulators comprise an inductive element, a capacitive element and some kind of switch, e.g. a switching transistor. The inductive element as well as the capacitor are used as energy storage means for transferring energy from an input to an output port in discrete packets. Principally, switching regulators feature higher efficiency than linear regulators.

Figure 1:
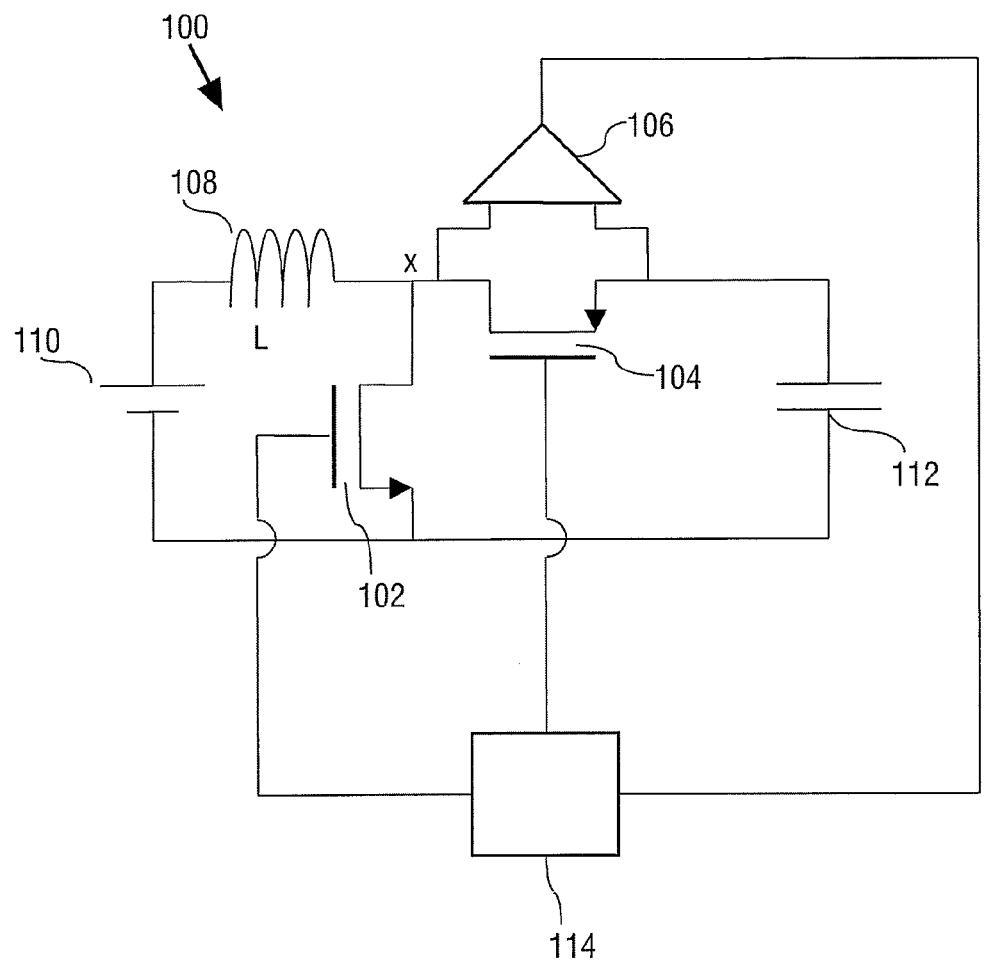

FIG. 1 illustrates a circuit diagram of a DC/DC up-converter 100 known in the prior art. The DC/DC converter 100 has an input voltage supply 110, typically a battery. It further has an output capacitor 112 and inductive element 108, typically implemented as a coil. Furthermore, the DC/DC converter 100 has two switches 102, 104 that are implemented by means of e.g. NMOS and PMOS transistors, respectively. The two switches 102, 104 are coupled in parallel. The capacitor 112 is arranged in series with the switch 104 and the coil 108 is arranged in series with respect to both switches 104, 102. Additionally, a comparator 106 is coupled in parallel to the switch 104.

The switching of the two switching transistors 102, 104 is controlled by means of a control unit 114. The control unit 114 is further coupled to the output of the comparator 106. Preferably, the two switching transistors 102, 104 are driven in a push-pull mode by means of the control unit 114. Either switching transistor 102 or switching transistor 104 allow flowing of an associate current. During operation, either one or both of the two switching transistors 102, 104 disrupt their associate current flow.

Figure 2:
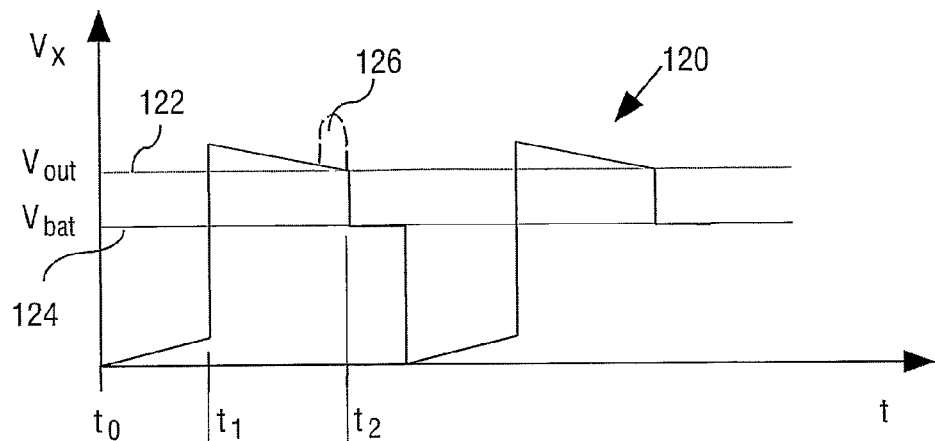
Figure 3:
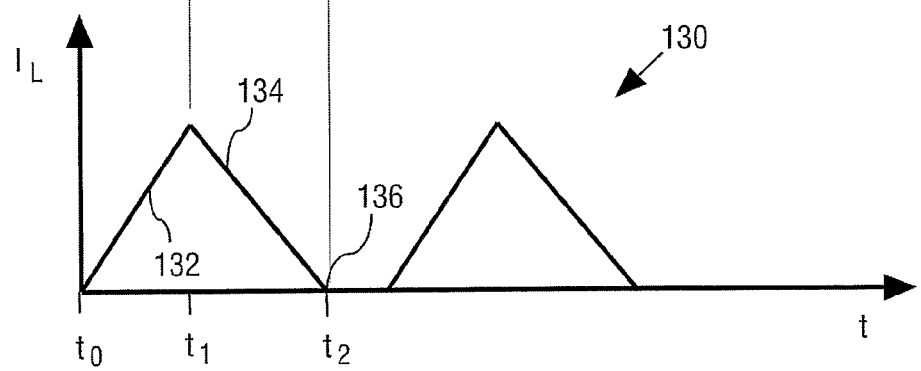

The principal operation of the DC/DC converter illustrated in FIG. 1 can be explained by means of the voltage diagram 120 of FIG. 2 and the corresponding current diagram 130 of FIG. 3. The voltage diagram 120 illustrates voltage across switching transistor 102 versus time and the current diagram 130 depicts the current flowing through the coil 108 versus time. At $t_0$ both switching transistors 102, 104 are switched off, i.e. electrical conductance is disrupted. Right after $t_0$ switching transistor 102 is switched on and the current through the coil 108 ramps up as can be seen by the rising edge 132 of the current diagram of FIG. 3. Here, the rising edge 132 only shows the rising of the current in the coil 108 in a simplified way; the rising of the current is typically linear with time. It substantially depends on the difference between input and output voltage and the size of the coil. However, the rise of the current may also feature a non-linear behavior that might be due to parasitic effects. Generally, the rise of the current is due to the inductive impact of the coil 108.

While the current rises, the coil 108 serves to store electrical energy. Typically, when the current reaches its maximum at $t_1$, the switching transistor 102 is switched off and the switching transistor 104 is switched on. This leads to a sudden rise of the voltage well above the input voltage level 124. The voltage even rises above the output voltage level 122. The rising of the voltage at $t_1$ above the input voltage level 124 is due to a release of the electrical energy stored in the coil 108. Hence, the current flowing through the coil 108 can be described by the falling edge 134. During this falling edge 134, the capacitor 112 is charged. Moreover, during this time interval between $t_1$ and $t_2$ the voltage across the switching transistor 102 decreases to the output voltage level 122.

At $t_2$ the voltage across switching transistor 102 equals the desired output voltage across the capacitor 112. Therefore, the voltage across switching transistor 104 substantially equals zero and as a consequence the current flowing through switching transistor 104 and hence through the coil 108 equals zero. Now, the switching transistor 104 has to be switched off immediately in order to prevent an undesired discharge of the capacitor 112.

If not switched off in time, energy stored in the capacitor 112 may dissipate towards the coil 108 in form of a current flowing through the switching transistor 104 in an opposite direction compared to the charging current. In order to prevent rising of this oppositely directed current, the comparator 106 serves to detect a zero crossing of the current at time $t_2$. Detection of the current's zero crossing can be indirectly performed by detecting a zero voltage across the switching transistor 104. In response to detect a zero crossing, the comparator 106 provides a switch off signal to the control unit 114 that in turn switches off the switching transistor 104.

In the following, both transistors 102, 104 are switched off, the voltage across switching transistor 102 drops to the input voltage level 124 and the current through the coil 108 substantially remains zero. After a certain time interval has elapsed, the entire duty cycle is repeated. The time interval between two successive duty cycles is governed by the load that is coupled to the DC/DC converter's output.

For an effective and reliable operation of the DC/DC converter it is important that the switch-off of the switching transistor 104 exactly matches the zero crossing of the current. In case that the switch-off is delayed, an oppositely directed discharge current of the capacitor 112 may arise that has a negative impact on the efficiency of the DC/DC conversion. In the opposite scenario, if the switching transistor 104 is switched off too early, i.e. prior to a zero crossing of the current, the remaining voltage across transistor 104 will have to dissipate. An associate current may discharge via the parasitic diode that exists between the drain and source of the switching transistor 104.

Such a discharge reflects in a distinct voltage peak 126 that is appreciably larger than the initial voltage offset at $t_1$ with respect to the output voltage level 122. Also in this scenario, operation of the DC/DC converter is sub-optimal because a certain amount of energy stored in the coil 108 is not effectively used for charging of the output capacitor 112.

In principle, accurate matching of a switch-off of the switching transistor 104 and a zero crossing of the current is rather sophisticated to achieve. Since the switching of the switching transistors 102, 104 is controlled by means of the control unit 114 that is adapted to react on an input signal derived from the comparator 106, there inevitably exists a certain delay. However, such a delay can be compensated by operating the comparator 106 with a predefined offset but the DC/DC converter may still behave very sensitively towards environmental changes, such as e.g. a varying temperature that has a non-negligible impact on the temporal behavior of the various electronic components of the DC/DC converter.

Moreover, the comparator 106 has to provide a high level of accuracy in order to measure very small voltage differences between drain and source of the transistor 104. Therefore, in the prior art the comparator 106 has to fulfill strict specification requirements.

The present invention aims to overcome the shortcomings of the prior art and aims to provide a DC/DC converter with improved means to detect a zero current or zero voltage across the switching transistor.

The present invention provides a DC/DC converter that has a switching transistor for controlling the flow of a current for charging of a capacitive element. The current for charging the capacitive element is provided by a DC voltage source and an inductive element that is adapted to store electrical energy. The DC/DC converter comprises first control means for initiating a switch-off of the switching transistor in response to a detection of a zero crossing of the current and second control means for detecting a deviation of the first control means and for generating an offset control signal for reducing the deviation of the first control means. This offset control signal that is generated by means of the second control means is provided to the first control means.

In this context, the first control means' deviation refers to a temporal mismatch between the switch-off of the switching transistor and the zero crossing of the current. The deviation is not only due to the first control means. It is also due to temporal behavior of the switching transistor itself and other signal processing means that are adapted to detect the zero crossing of the current and/or the zero crossing of the voltage across the switching transistor.

The second control means are adapted to detect a mismatch between the switch-off of the switching transistor and the zero crossing of the current. Upon detection of such a deviation, the second control means generate an offset control signal that is fed back to the first control means in order to reduce a deviation in a subsequent duty cycle of the DC/DC converter. In this way the second control means provide a feedback loop in order to control an accurate operation of the first control means and/or the switching transistor.

Moreover, the second control means allow for a dynamic mismatch compensation, i.e. a potential mismatch between a switch-off and a zero current detection is detected and measured and a corresponding offset control signal is actively generated in order to effectively compensate the mismatch in a subsequent duty cycle. In this way, the inventive DC/DC converter can dynamically adapt to various external conditions that may arbitrarily change during operation of the DC/DC converter. In particular, this dynamic mismatch—or offset compensation allows to implement electronic components featuring a larger tolerance margin and that are available as low cost components. Hence, by making use of this dynamic compensation and active zero current detection scheme, stringent specification requirements as they are known from the prior art do no longer have to be strictly fulfilled.

According to a preferred embodiment of the invention, the deviation of the first control means comprises a switch-off of the switching transistor prior to the zero crossing of the current. Also here, a deviation is by no means restricted to deviation of the first control means. In this embodiment a deviation refers to an early switch-off of the switching transistor with respect to the zero crossing of the current flowing through the transistor. In this case only an early switch-off of the switching transistor is detected by means of the second control means. Hence, a delayed switch-off, i.e. disruption of the electric circuit after a zero crossing of the current and/or voltage is not detected by the second control means. Consequently, the second control means are therefore only adapted to detect an advancing mismatch between switch-off and zero crossing.

According to a further preferred embodiment of the invention, the second control means are implemented as a comparator that is adapted to detect a voltage peak across the switching transistor. This voltage peak is in turn indicative of the switching transistor's switch-off prior to the zero crossing of the current. Hence, the comparator representing the second control means is able to detect a particular voltage peak arising across the switching transistor if the transistor is switched off too early, i.e. prior to the zero crossing of the current and/or the voltage. In typical implementations, where the switching transistor is implemented on the basis of metal oxide semi-conductor (MOS) techniques, this voltage peak may well exceed several hundreds of mV.

According to a further preferred embodiment of the invention, the second control means are further adapted to generate an offset control signal for delaying the switching transistor's switch-off if the second control means detect a switch-off of the switching transistor prior to a zero crossing of the current. If the second control means, e.g. the comparator, detect an early switch-off of the switching transistor, e.g. by detecting the distinct voltage peak across the switching transistor in the vicinity of the zero crossing, the offset control signal generated by the comparator serves to delay the switching transistor's switch-off in the subsequent duty cycle.

Preferably, this offset control signal is indicative of an incremental increase of the first control means delay. Since the first control means delay is effectively controlled by means of a predefined offset, the offset control signal serves to increment this predefined delay whenever an early switch-off of the switching transistor has been detected via a detection of the distinct voltage peak across the switching transistor.

According to a further preferred embodiment of the invention, the second control means are further adapted to generate an offset control signal for advancing the switching transistor's switch-off if the second control means do not detect a switch-off of the switching transistor prior to a zero crossing of the current. In this embodiment the DC/DC converter accounts for those cases where the switch-off of the switching transistor is delayed with respect to the zero crossing of the charging current. A missing of the distinct voltage peak across the switching transistor is indicative of either a zero mismatch or a delay of the transistors' switch-off.

Even though an accurate matching of the switch-off and the zero crossing represents an optimal operation mode of the DC/DC converter the second control means do not allow to distinguish between a zero mismatch and a severe delay of the switch-off. Since a rather large delay of the switch-off has a larger negative impact than advancing of an accurate switch-off by one increment, the second control means are adapted to generate an advancing offset control signal for the first control means whenever an early switch-off of the switching transistor is not detected during a considered time interval in which the zero crossing of the current occurs.

According to a further preferred embodiment of the invention, the size of the voltage peak that is detected by means of the second control means determines the magnitude of the offset control signal. Typically, the size of the voltage peak arising due to an early switch-off of the switching transistor is also indicative of the size of the mismatch between switch-off and current zero crossing. Therefore, by analyzing the size of the voltage peak by means of the second control means, the offset control signal that is provided to the first control means may initiate an offset of several increments.

Hence by not only detecting an existence but also the size of this distinct voltage peak, the corresponding offset control signal may initiate a corresponding offset signal for the first control means. In this way, a large mismatch can be detected and a corresponding large compensation signal can be generated and provided to the first control means. As an advantage, a rather large mismatch can be compensated by means of a single duty cycle instead of iteratively executing a plurality of successive duty cycles, each of which providing a predefined delay of the switching transistor's switch-off.

According to a further preferred embodiment of the invention, the first control means are further adapted to enable a second control means. Since the second control means are only designed for detecting the first control means' deviation in a time interval in the vicinity of the zero crossing of the current, i.e. at the end of a duty cycle, the second control means do not have to be active during an entire duty cycle. In particular, the enabling of the second control means by means of the first control means effectively allows for an efficient use of the second control means.

Preferably, the second control means that are e.g. implemented as a comparator, are coupled to the first control means output. For example, the second control means are enabled in response to a flag of the first control means, i.e. when the first control means generate a switch-off signal. Preferably, the second control means feature a fast response that is sufficient to detect the distinct voltage peak arising across the switching transistor after an enabling of the second control means.

Otherwise, when for example the distinct voltage peak is not present due to a delayed switch-off, the second control means are also enabled. In this case the second control means are not able to detect the distinct voltage peak because it did not arise. Due to a missing detection of a non existing voltage peak, the second control means are adapted to generate an appropriate offset control signal that serves to advance a subsequent switch-off of the switching transistor.

Alternatively, enabling of the second control means might also be controlled by means of the control unit. Since the control unit is adapted to trigger switching of the switching transistor, it might be well adapted to additionally trigger the second control means.

According to a further preferred embodiment of the invention, the inventive DC/DC converter is adapted to provide a DC/DC up-conversion. In this way the various components of the DC/DC converter provide a packet wise transfer of electric energy to the output capacitor. This packet wise energy transfer serves to provide a DC output voltage that is substantially larger than a DC input voltage. The dynamic offset compensation or mismatch compensation scheme provided by the inventive DC/DC converter is preferably applicable to detection of a zero crossing of the charging current of the output capacitor. This configuration is in particular relevant for DC/DC up-conversion.

However, detection of a zero current and/or zero voltage as well as detection of a predefined current level or voltage level might be universally implemented on the basis of the inventive dynamic mismatch compensation scheme. Hence, the invention is by no means restricted to zero voltage detection but might be arbitrarily used for detection of a predefined current or voltage level, that might be useful for e.g. a DC/DC down-converter.

According to a further preferred embodiment of the invention, the second control means are further adapted to detect a voltage peak that has a duration in the range of nanoseconds. The distinct voltage peak arising due to an early switch-off of the switching transistor typically features a duration of a few nanoseconds. In order to be able to detect this distinct voltage peak, the second control means are preferably implemented on the basis of a comparator that allows for detection of voltage signals in the nanosecond range.

In another aspect, the invention provides a method of operating a DC/DC converter that has a switching transistor for controlling the flow of a current for charging a capacitive element. This charging current is provided by a DC voltage source and an inductive element that serves to store and to provide electric energy. This DC/DC converter further has first control means for initiating a switch-off of the switching transistor in response to a detection of a zero crossing of the charging current. The method of operating of the DC/DC converter comprises detecting a deviation of the first control means on the basis of second control means and generating an offset control signal by means of the second control means and providing this offset control signal to the first control means in order to reduce the first control means' deviation. In this context, deviation comprises a switch-off of the switching transistor prior to the zero crossing of the current flowing through the switching transistor.

In still another aspect, the invention provides a battery driven electronic device that comprises a DC/DC converter that has a switching transistor for controlling the flow of a current for charging of a capacitive element. The DC/DC converter of the battery driven electronic device comprises first control means for initiating a switch-off of the switching transistor in response to a detection of a zero crossing of the charging current and second control means for detecting a deviation of the first control means and for generating an offset control signal for reducing the deviation of the first control means. Additionally, this offset control signal is provided to the first control means.

Further, it is to be noted that any reference signs in the claims are not to be construed as limiting the scope of the present invention.

Figure 4:
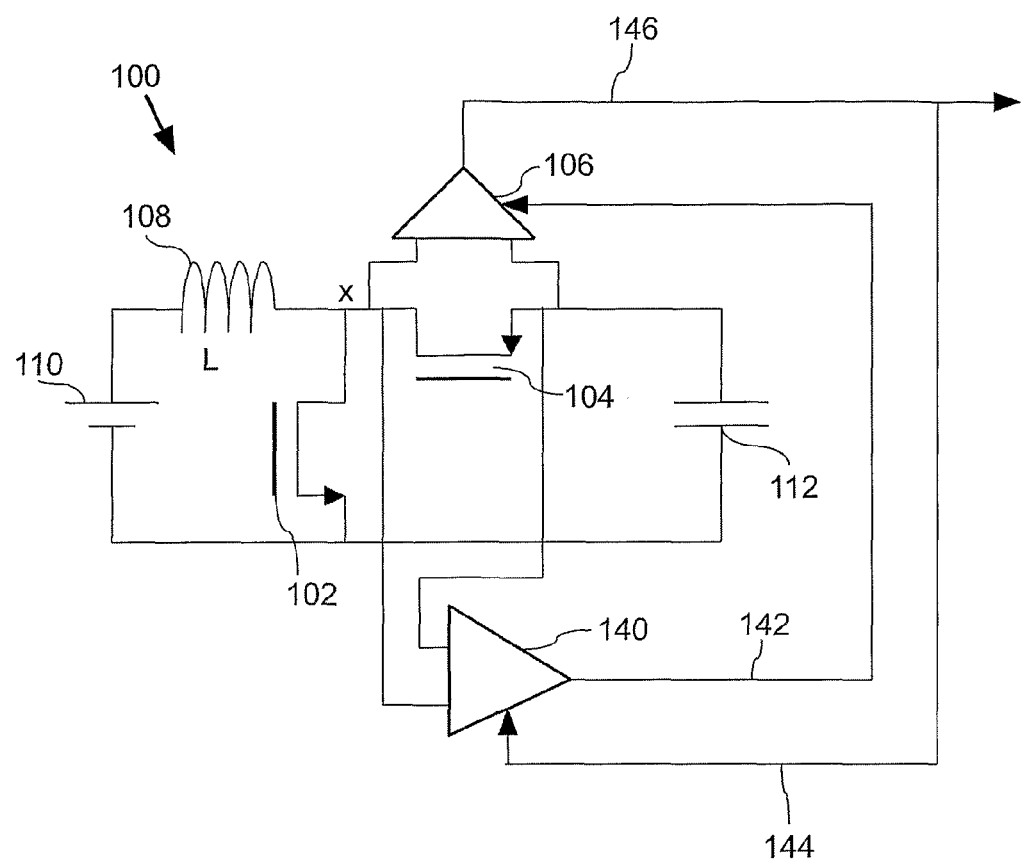

In the following, preferred embodiments of the invention will be described in greater detail by making reference to the drawings in which:

FIG. 1 schematically shows a circuit diagram of a prior art DC/DC up-converter,

FIG. 2 shows a voltage diagram of two successive duty cycles of a DC/DC up-converter, FIG. 3 shows a current diagram of two successive duty cycles of the DC/DC up-converter, FIG. 4 schematically shows a circuit diagram of the inventive DC/DC converter.

The voltage diagram 120 of FIG. 2 as well as the corresponding current diagram 130 of FIG. 3 refer to the prior art implementation of the DC/DC converter as shown in FIG. 1 as well as to the inventive DC/DC converter illustrated in FIG. 4. In FIG. 2 the distinct voltage peak 126 is shown that arises when the switch-off of the switching transistor 104 occurs prior to a zero crossing of the charging current flowing through the switching transistor 104. In this case the offset of the comparator 106 is such that the comparator 106 flags too early leading to a too early switching of the switching transistor 104.

FIG. 4 is illustrative of the inventive DC/DC converter having a dynamic offset control. The DC/DC converter 100 has two switching transistors 102, 104 that are preferably implemented as NMOS and PMOS transistors, respectively. The DC/DC converter further has a coil 108 as well as a capacitor 112 that serve to store electric energy provided by the voltage supply 110. Voltage supply 110 is for example implemented as a battery providing a DC voltage and a corresponding DC current. The two switching transistors 102, 104 are controlled by means of a control unit that is not explicitly shown here.

A switch-on of the switching transistor 102 leads to a rising of the current flowing through the coil 108. A subsequent alternate switching of the two transistors, i.e. switching off of transistor 102 and switching on of transistor 104 leads to a sudden rising of the voltage across transistor 102 and across capacitor 112. Since electric energy is provided by the coil 108 as well as by the DC voltage supply 110, the output voltage that can be tapped across the capacitor 112 rises even above the output voltage level 122. Since the electric energy charged in the coil 108 is finite, the voltage across the capacitor 112 may decrease until it reaches a value of the output voltage level 122. At this point of time $t_2$ the current flowing through the transistor 104 substantially equals zero which is detected by means of the comparator 106. In response to this zero detection, the comparator 106 flags and submits a corresponding flag signal to the control unit in order to switch-off the transistor 104. The flag signal is further transmitted to the comparator 140 in order to enable the latter. Comparator 140 effectively provides the second control means for detecting a distinct voltage peak arising across the transistor 104 in case that transistor 104 has been switched off prior to a zero crossing of the current flowing through transistor 104.

Therefore, the input terminals of comparator 140 are coupled to source and drain of the transistor 104 in order to measure the voltage peak across the transistor 104. The output terminal of the comparator 140 is coupled to comparator 106 via the offset control line 142. In this way an offset control signal generated by means of the comparator 140 can be effectively provided to the comparator 106. This offset control line 142 serves to directly couple the two comparators 140, 106.

The comparator 140 is preferably adapted to provide two different kinds of offset control signals. A first kind of offset control signal serves as a delay offset signal and a second kind of offset control signal serves as an advancing offset signal. The delay offset signal is generated by means of the comparator 140 in response to detection of a distinct voltage peak across transistor 104 that is indicative of an early switch-off of the transistor 104. An advancing signal is generated by means of the comparator 140 in complimentary cases, i.e. when no distinct voltage peak is detected during a considered time interval.

In this way the offset of comparator 106 is permanently and actively controlled. The comparator 140 serves to generate either an incremental or a decremental offset signal that serve to either increment or decrement the offset of the comparator 106, respectively. Consequently, the offset of the comparator 106 that governs the switching time of the transistor 104 is actively and iteratively manipulated in order to maintain a minimum mismatch of the switching transistor's 104 switch-off and the zero crossing of the corresponding current.

In this way the comparator 106 no longer has to be implemented as a high precision comparator featuring a small intrinsic offset and low temperature effects. The dynamic offset control of the comparator 106 allows implementation of comparators featuring appreciable manufacturing tolerances and temperature drift. Moreover, the comparator 140 that serves to detect the distinct voltage peak may also be implemented as a comparator with a low sensitivity, because the characteristic voltage peaks typically exceed 100 mV. The comparator 140 only has to provide a sufficient fast response when enabled by means of flagging of the comparator 106 via enabling line 144. Since the specification requirements for both comparators 106, 140 are substantially reduced compared to comparators used in the prior art, the comparators 106, 140 can also be implemented in a more compact, hence space saving way.

Further, it is to be mentioned, that technical implementation of the switching transistors 102, 104 and the comparators 106, 140 is by no means limited to metal-oxide semiconductor technology (MOS) or to complementary metal-oxide semiconductor technology (CMOS). Generally, the electronic components of the DC/DC converter might be implemented on the basis of any suitable semiconductor technology, such as e.g. silicon bipolar technology or Gallium Arsenide (GaAs) heterojunction bipolar transistor (HBT) technology.

LIST OF REFERENCE NUMERALS

100 DC/DC converter
102 switching transistor
104 switching transistor
106 comparator
108 coil
110 voltage supply
112 capacitor
114 control unit
120 voltage diagram
122 output voltage level
124 input voltage level
126 voltage peak
130 current diagram
132 rising current edge
134 falling current edge
136 zero crossing
140 comparator
142 offset control line
144 enabling line
146 comparator output line

The invention claimed is:

1. A DC/DC converter having a switching transistor for controlling the flow of a current for charging of a capacitive element, the DC/DC converter comprising:
    first control means adapted to initiate a switch-off of the switching transistor in response to a detection of a zero crossing of the current; and
    second control means adapted to detect a voltage peak across the switching transistor, the voltage peak being indicative of the switching transistor's switch-off prior to the zero crossing of the current due to an offset of the first control means, and generate an offset control signal for reducing the offset of the first control means, the offset control signal being provided to the first control means.

2. The DC/DC converter according to claim 1, wherein the second control means is implemented as a comparator being adapted to detect the voltage peak across the switching transistor.

3. The DC/DC converter according to claim 1, wherein the second control means is adapted to generate an offset control signal for delaying the switching transistor's switch-off if the second control means detects the voltage peak being indicative of a switch-off of the switching transistor prior to a zero crossing of the current.

4. The DC/DC converter according to claim 1, wherein the second control means is adapted to generate an offset control signal for advancing the switching transistor's switch-off if the second control means does not detect the voltage peak being indicative of a switch-off of the switching transistor prior to a zero crossing of the current.

5. The DC/DC converter according to claim 1, wherein the size of the voltage peak detected by the second control means determines the magnitude of the offset control signal.

6. The DC/DC converter according to claim 1, wherein the first control means is adapted to enable the second control means.

7. The DC/DC converter according to claim 1, wherein the DC/DC converter provides DC/DC up-conversion.

8. The DC/DC converter according to claim 1, wherein the second control means is adapted to detect a voltage peak having a duration in the range of nanoseconds.

9. A method of operating a DC/DC converter having a switching transistor adapted to control the flow of a current for charging a capacitive element the DC/DC converter further having first control means adapted to initiate a switch-off of the switching transistor in response to a detection of a zero crossing of the current, the method of operating comprising the steps of:
  detecting a voltage peak across the switching transistor, the voltage peak being indicative of the switching transistor's switch-off prior to the zero crossing of the current due to an offset of the first control means; and
  generating an offset control signal by a second control means and providing the offset control signal to the first control means in order to reduce the offset of the first control means.

10. The method according to claim 9, wherein generating an offset control signal by the second control means further comprises generating an offset control signal for delaying the switching transistor's switch-off if the second control means detects the voltage peak being indicative of a switch-off of the switching transistor prior to a zero crossing of the current.

11. The method claim according to claim 9, wherein generating an offset control signal by the second control means further comprises generating an offset control signal for advancing the switching transistor's switch-off if the second control means does not detect the voltage peak being indicative of a switch-off of the switching transistor prior to a zero crossing of the current.

12. The method according to claim 9 further comprising: providing DC/DC up-conversion.

13. A battery driven electronic device comprising:
  a DC/DC converter comprising:
    first control means adapted to initiate a switch-off of the switching transistor in response to a detection of a zero crossing of the current; and
    second control means adapted to detect a voltage peak across the switching transistor, the voltage peak being indicative of the switching transistor's switch-off prior to the zero crossing of the current due to an offset of the first control means, and generate an offset control signal for reducing the offset of the first control means, the offset control signal being provided to the first control means.

14. The device according to claim 13, wherein the second control means is implemented as a comparator adapted to detect the voltage peak across the switching transistor.

15. The device according to claim 14, wherein the size of the voltage peak detected by the second control means determines the magnitude of the offset control signal.

16. The device according to claim 13, wherein the second control means is adapted to generate an offset control signal for delaying the switching transistor's switch-off if the second control means detects the voltage peak being indicative of a switch-off of the switching transistor prior to a zero crossing of the current.

17. The device according to claim 13, wherein the second control means is adapted to generate the offset control signal for advancing the switching transistor's switch-off if the second control means does not detect the voltage peak being indicative of a switch-off of the switching transistor prior to a zero crossing of the current.

18. The device according to claim 13, wherein the first control means is adapted to enable the second control means.

19. The device according to claim 13, wherein the device provides DC/DC up-conversion.

20. The device according to claim 13, wherein the second control means is adapted to detect the voltage peak having a duration in the range of nanoseconds.

* * * * *

UNITED STATES PATENT AND TRADEMARK OFFICE
CERTIFICATE OF CORRECTION

PATENT NO. : 7,952,336 B2  
APPLICATION NO. : 11/575305  
DATED : May 31, 2011  
INVENTOR(S) : Remco Brinkman Page 1 of 1

It is certified that error appears in the above-identified patent and that said Letters Patent is hereby corrected as shown below:

Column 8, Claim 2, line 62, after "comparator" delete -- being --.

Signed and Sealed this  
Sixth Day of September, 2011

David J. Kappos  
*Director of the United States Patent and Trademark Office*